Patented Feb. 22, 1949

2,462,346

UNITED STATES PATENT OFFICE 2,462,346

AROMATIC POLYFLUORO FOUR-CARBON ATOM RING COMPOUNDS

Paul L. Barrick, Wilmington, Del., assignor to E. I. du Pont de Nemours & Company, Wilmington, Del., a corporation of Delaware No Drawing. Application September 3, 1943, Serial No. 501,147

13 Claims. (Cl. 260—646)

This invention relates to organic fluorine compounds and to processes for the production thereof. More particularly it relates to aromatic compounds comprising a fluorine-containing four-carbon atom ring and to processes for producing said compounds.

This application is a continuation in part of my co-pending U. S. application Serial No. 484,239, filed April 23, 1943.

It has previously been proposed to produce organic fluorine compounds by the reaction of fluorine with various organic materials. Such investigations as have been made have shown that this reaction is extremely energetic and generally causes pyrolysis of the organic material, resulting in the formation of carbon, tar or other undesirable carbonaceous decomposition products. The usual methods for preparing organic fluorine compounds have been to replace chlorine or bromine with fluorine by means of various inorganic fluorinating reagents such as antimony fluorides, silver fluoride, or mercuric oxide and hydrogen fluoride but these hazardous, expensive methods, at best, yield mixtures, and their application is restricted to certain types of halogenated hydrocarbons. In view of the difficulty of preparing fluorinated compounds, few aromatic fluorine compounds have been prepared.

I have now discovered a new class of stable, fluorine-containing aromatic compounds and that said fluorine-containing compounds can be prepared readily without using dangerous or expensive inorganic reagents. Accordingly, this invention has as an object new fluorine-containing aromatic compounds. A further object is a new class of aromatic compounds which comprise a fluorine-containing four-carbon atom ring. Still further objects are new aryl fluorocyclobutanes. Further objects reside in methods for preparing these compounds. Additional objects will become apparent from an examination of the following description and claims.

These and other objects and advantages are accomplished by the herein described invention which broadly comprises new organic fluorine compounds, namely, aromatic compounds comprising a fluorine-containing four-carbon atom ring.

In a more restricted sense this invention comprises monomeric compounds having the general formula RY in which R is an aromatic group containing not more than 3 six-carbon atom rings and Y is a four-carbon atom ring containing at least two fluorine atoms.

A preferred embodiment of this invention comprises a monomeric compound having the general formula

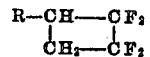

in which R is a phenylic group.

According to this invention the aforementioned compounds are obtained by a process which broadly comprises reacting an unsaturated aromatic compound with a fluoroethylene which is stable against polymerization on standing under pressure at 25° C.

In a more restricted sense the process of this invention comprises reacting a compound having the general formula $CH_2=CR_2$ wherein the R substituents are monovalent radicals selected from the group consisting of hydrogen, halogens and monovalent organic radicals, at least one of the R substituents being an aromatic group containing not more than 3 six-carbon atom rings, with a polyfluoroethylene which is stable against polymerization on standing under pressure at 25° C.

A preferred embodiment of this invention comprises heating a compound having the general formula $CH_2=CHR$, in which R is a phenylic group, with tetrafluoroethylene which is stable against polymerization on standing under pressure at 25° C.

By the term "aromatic group" as used herein and in the appended claims is meant an aryl or substituted aryl group, i. e. one containing the six-carbon atom ring

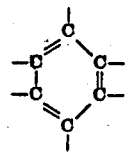

By the expression "aryl group" as used herein and in the appended claims is meant any univalent aromatic hydrocarbon radical, as phenyl, tolyl, biphenylyl, naphthyl or anthracyl whose free valence belongs to the nucleus and not to a side chain.

By the term "phenylic group" as used herein and in the appended claims is meant the phenyl group or a substituted phenyl group.

By the phrase "unsaturated aromatic compound" as used herein and in the appended claims is meant an aromatic compound which contains an ethylenic or acetylenic linkage in a side chain.

The prefix "poly" as used herein refers to the number of fluorine atoms and not to polymeric materials.

According to the present invention a fluoroethylene, such as tetrafluoroethylene, is reacted with an unsaturated aromatic compound such as styrene, at an elevated temperature to yield the corresponding 1-phenyl-2,2,3,3-tetrafluorocyclobutane. The reaction can be carried out under pressure in a closed system or by means of a vapor phase reaction at subatmospheric, atmospheric or superatmospheric pressure. Substituted aryl fluorocyclobutanes such as nitrophenyltetrafluorocyclobutane can be prepared in similar manner using nitrostyrene, or another method consists in nitrating the above phenyltetrafluorocyclobutane.

The following examples, in which proportions are given in parts by weight unless otherwise specified, are given for illustrative purposes and are not intended to place any restrictions or limitations on the herein described invention:

*Example I*

A stainless-steel autoclave was flushed with nitrogen, charged with 110 parts of styrene and then cooled and evacuated. After adding 50 parts of tetrafluoroethylene, the reactor was closed and heated at 175° C. for about 13 hours. The viscous reaction mixture was steam-distilled to separate the monomeric 1-phenyl-2,2,3,3-tetrafluorocyclobutane from the polymeric material. The phenyltetrafluorocyclobutane was distilled under reduced pressure to yield 65 parts of pure product boiling at 61–62° C./5 mm. and having the following index of refraction and density: $n_D^{25}$, 1.4512; $d_4^{25}$, 1.2714. The material possessed a characteristic odor.

To a mixture of 10 parts of concentrated nitric acid and 15 parts of concentrated sulfuric acid was added 20 parts of 1-phenyl-2,2,3,3-tetrafluorocyclobutane with stirring. The temperature of the reaction mixture rose to 40–45° C. The reaction mixture was warmed slightly in a water bath for about two hours, but care was taken that the temperature did not go above about 50° C. The upper organic layer was separated and washed with water, sodium bicarbonate solution and then again with water, and dried. Distillation under reduced pressure through a packed column yielded about 4 parts of unreacted phenyltetrafluorocyclobutane and about 16 parts of isomeric mononitrophenyltetrafluorocyclobutanes about 6 parts of which distilled at 109–117.5° C./2 mm. and about 10 parts of which distilled at about 119–122° C./2 mm. which had the following physical properties: $n_D^{25}$, 1.4950; $d_4^{25}$, 1.4448.

| | F% |
|---|---|
| Analysis found | 30.97 |
| Calculated for $C_{10}H_7F_4NO_2$ | 30.52 |

Two hundred and four parts of 1-phenyl-2,2,3,3,-tetrafluorocyclobutane containing 2 parts of anhydrous ferric chloride as catalyst was chlorinated by passing chlorine into the mixture. Hydrogen chloride was evolved. After about seven hours, the addition of chlorine was stopped when the increase in weight of the reaction mixture was 73 parts indicating the addition of two chlorine atoms into the molecule. The reaction mixture was steam-distilled and the steam-volatile water-insoluble products separated and dried. Upon distillation 242 parts of a mixture of dichlorophenyltetrafluorocyclobutanes boiling at 124–138° C./13 mm. was obtained.

Analysis: Calculated for $C_{10}H_6F_4Cl_2$: Cl, 26.05%; found: Cl, 26.08%.

*Example II*

To 25 parts of oxygen-free distilled water in a stainless steel reactor was added 21 parts of purified styrene and 20 parts of tetrafluoroethylene containing less than 20 P. P. M. of oxygen. The reaction mixture was heated to 120° C. and pressured to 1000–1200 lbs./in.² by injection of water and agitated for 16 hours. The reactor was cooled to room temperature and the reaction mixture was subjected to steam distillation. A yield of 25 parts of 1-phenyl-2,2,3,3-tetrafluorocyclobutane boiling at 96° C./30 mm. was obtained. On repeating the above experiment and including 0.01 part of hydroquinone in the reaction mixture, a yield of 27 parts of 1-phenyl-2,2,3,3-tetrafluorocyclobutane was obtained. In an experiment similar to the above in which .05 part of benzoyl peroxide was included in the reaction mixture, a yield of 22.5 parts of 1-phenyl-2,2,3,3-tetrafluorocyclobutane was obtained.

Members of the new class of organic fluorine compounds which are the subject of this invention have the general formula RY in which R is a monovalent organic radical containing an aromatic group which contains not more than 3 six-carbon atom rings and Y is a monovalent organic radical containing a poly fluoro-substituted four-carbon atom ring. In a more restricted sense the novel compounds of this invention have the general formula RY in which Y is a fluorine-containing four-carbon atom ring having at least 2 fluorine atoms attached to the carbon atoms in positions 2 and 3 in the ring and R is an aromatic group containing not more than 3 six-carbon rings and is attached to the carbon atom in position 1 in said four-carbon atom ring. Examples of aromatic groups contemplated in this invention are phenyl, benzyl, tolyl, biphenylyl, naphthyl and anthracyl groups which are unsubstituted or substituted by groups such as alkyl, methyl, ethyl, halogen, chloro, bromo, nitro, carboxylic, carbalkoxy, hydroxy, sulfonic, cyano, amino, alkoxy, acetyl, formyl, chloromethyl and the like. While the novel compounds of this invention may contain any aromatic group which contains not more than 3 six-carbon atom rings, the compounds which have most desirable properties and which are therefore preferred have the general formula RY in which R is a phenylic group, i. e., an aromatic group selected from the class consisting of the phenyl group and substituted phenyl groups, and Y is a fluorine-containing four-carbon atom ring having at least 2 fluorine atoms attached to the carbon atoms in positions 2 and 3 in said ring.

Examples of substituted phenyl groups include tolyl, xylyl, mesityl, ethylphenyl, propylphenyl, tetramethylphenyl, pentamethylphenyl, chlorophenyl, bromophenyl, iodophenyl, chlorotolyl, sulfophenyl, chlorosulfonylphenyl, sulfamylphenyl, hydroxyphenyl, hydroxytolyl, nitrophenyl, dinitrophenyl, nitrotolyl, dinitrotolyl, trinitrotolyl, hydroxynitrophenyl, chloronitrophenyl, aminophenyl and aminotolyl groups, and the like.

The products of this invention can be more particularly described as monomeric aromatic compounds having the general formula RY in which Y is an organic radical containing a polyfluorocyclobutane or polyfluorocyclobutene ring and R is an aromatic group which contains not more than 3 six-carbon atom rings and is attached to a carbon atom in the four-carbon atom ring. For optimum results said ring contains at least 4 halogen atoms, preferably at least 4 fluorine atoms. While the four-carbon atom ring in the aromatic compounds of this invention may be a fluorocyclobutane ring or a fluorocyclobutene ring, it is preferred, because of the superior properties of the product, that said ring be a fluorocyclobutane ring. The most useful compounds of this invention have the general formula

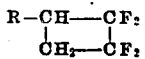

in which R is a phenylic group.

It is apparent that the present invention comprises an extensive number of aromatic compounds containing a fluorine-substituted four-carbon atom ring. Included among examples of said compounds are those represented by the following general formula

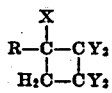

wherein R contains an aromatic group containing not more than three 6-carbon atom rings; Y is hydrogen or halogen, at least two of the Y substituents being fluorine; and X is hydrogen, halogen or a monovalent organic radical. A preferred group of compounds falling under the above formula have the Y substituent entirely halogen, at least two of which are fluorine, and in a still more preferred group the Y's are all fluorines. The R substituent in the preferred compounds is aryl or substituted aryl containing not more than three 6-carbon atom rings, and in the still more preferred compounds R is phenylic, that is, phenyl or substituted phenyl. Examples of monovalent organic radicals contemplated include alkyl, alkenyl, cycloalkyl, aryl, aralkyl, alkoxy, ester, cyano, carboxyl, carbalkoxy, amido, acyl, formyl and methylol radicals.

Other examples of compounds included in the present invention are those represented by the following general formulae:

(1) 

wherein R is an aromatic group containing not more than 3 six-carbon atom rings and X is a monovalent radical selected from the group consisting of hydrogen, halogens and monovalent organic radicals;

(2) 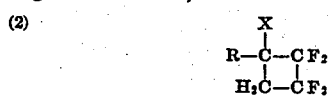

wherein R is a phenylic group and X is a monovalent radical selected from the group consisting of hydrogen, halogens and monovalent organic radicals;

(3) 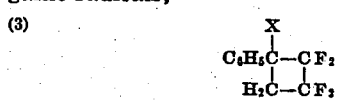

wherein X is a monovalent radical selected from the group consisting of hydrogen, halogens and monovalent organic radicals;

(4) 

wherein R is a substituted phenyl group and X is a monovalent radical selected from the group consisting of hydrogen, halogens and monovalent organic radicals;

(5) 

wherein R is an aromatic group containing not more than 3 six-carbon atom rings;

(6) 

wherein R is an aryl group containing not more than 3 six-carbon atom rings;

(7) 

wherein R is a substantial aryl group containing not more than 3 six-carbon atom rings;

(8) 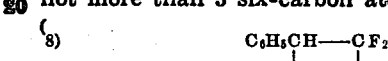

(9) 

wherein R is a substituted phenyl group;

(10) 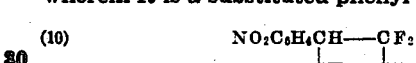

As mentioned previously, the products of this invention can be prepared by heating a fluoroethylene with an unsaturated aromatic compound. As examples of fluoroethylenes which can be employed in the present reaction may mention tetrafluoroethylene, trifluoroethylene, 1,1 - difluoro - 2,2-dichlorethylene, 1,2-difluoro-1,2-dichloroethylene, vinylidene fluoride, trifluorochlorethylene, 1,1 - difluoro-2-chloroethylene, and trifluorobromoethylene. Fluoroethylenes which are trihaloethylenes and especially fluoroethylenes containing at least three fluorine atoms react most readily and are preferred. Especial significance is attached to the completely fluorinated ethylene, tetrafluoroethylene.

In order to provide the products of this invention the fluoroethylene employed in the above process should be stable against polymerization on standing under pressure at 25° C. The preparation of stabilized tetrafluoroethylene, which is not a part of this invention, can be accomplished by different means. One method consists in reducing the normally contained oxygen content (about 0.1% to 0.2% by volume) to not more than 40 parts of oxygen in a million parts of tetrafluoroethylene. Another method for stabilizing tetrafluoroethylene against polymerization consists in adding polymerization inhibiting compounds. Compounds of this kind are those containing thiol sulfur, examples of which are n-butyl mercaptan, hydrogen sulfide, etc., and compounds containing amine nitrogen, for example, ammonia, di- and tri-butyl amine, and other amines. These methods are described more fully in U. S. Patents 2,407,396, 2,407,419 and 2,407,405.

The unsaturated aromatic compounds which can be reacted with fluoroethylenes in accordance with this invention include aromatic compounds which contain an ethylenic or acetylenic linkage in a side chain. The unsaturated aromatic compounds which provide superior products and are therefore preferred contain a terminal methylene group,

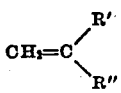

wherein R' and R'' are monovalent radicals selected from the group consisting of hydrogen, halogens and monovalent organic radicals, and wherein at least one of said monovalent radicals is an aromatic group containing not more than 3 six-carbon atom rings. Examples of monovalent organic radicals are alkyl, alkenyl, alkynyl, cycloalkyl, aryl, aralkyl, alkoxy, ester, cyano, carboxyl, amido, acyl, formyl, methylol radicals; while examples of unsaturated aromatic compounds are styrene, vinylnaphthalene, divinyl benzene, o-, m-, and p-substituted styrene derivatives such as alkyl, methyl, acyl, formyl, chloro, bromo, cyano, alkoxy, hydroxy, and nitro styrenes, allylbenzene, methallylbenzene, phenyl vinyl ether, phenyl allyl ether, allylphenols, 1-phenylbutadiene-1,3, phenyl acetylene, alpha-phenyl acrylic acid and derivatives thereof such as esters, anhydrides, amides and nitriles, 2-phenyl-propene, alpha-chlorostyrene, and the like. While any unsaturated aromatic compound containing not more than 3 six-carbon atom rings may be employed I prefer, in view of the superior products had therewith, to react the fluoroethylene with an aromatic compound having the general formula $CH_2=CR_2$ in which the R substituents are monovalent radicals selected from the group consisting of hydrogen, halogens and monovalent organic radicals, and at least one of the R substituents is a phenylic group.

Examples of the reactions involved in the preparation of my novel aromatic compounds by heating an unsaturated aromatic compound with a fluoroethylene are:

(1)

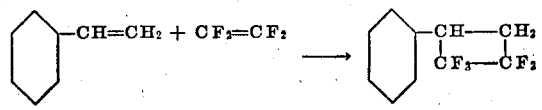

(2)

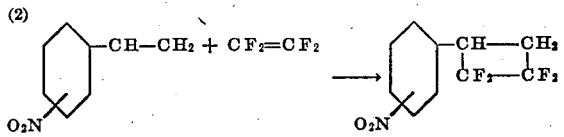

Higher substituted-aryl fluorocyclobutanes and fluorocyclobutenes can be obtained by varying the reactants or conditions and it will be understood that the operating conditions may vary widely depending upon the compounds which are being reacted and also upon the fluorocycloaromatic compound which is desired.

In the preparation of the novel aromatic compounds of this invention by reacting a fluoroethylene with an unsaturated aromatic compound, it is desirable to carry out the reaction under substantially non-polymerizing conditions. In general, it is preferable to exclude polymerization catalysts and to sometimes use a small amount of polymerization inhibitor such as hydroquinone, "Terpene B" hydrocarbon, or tributylamine. One reason why added inhibitors are not usually necessary may be due to the mutual inhibition exerted by the fluoroethylenes and unsaturated aromatic compounds. The proportions of inhibitors may vary within relatively wide limits depending largely upon the nature of the reactants. Generally speaking, very desirable results are obtained with none or only relatively small amounts of inhibitor corresponding to .0001 to 3% by weight of the material treated. It is sometimes desirable to use a mixture of inhibitors since the effectiveness of the various inhibitors may not be the same for the fluoroethylene and for the unsaturated aromatic compound.

The proportion of reactants may vary within relatively wide limits depending largely upon the nature of the reactants, the method of operation, and the results desired. Stoichiometrically, one equivalent of a fluoroethylene corresponds to one equivalent of a monoethylenic unsaturated aromatic compound. In general, an excess of the less expensive unsaturated aromatic compound is desirable and in addition, the excess unsaturated aromatic compound may serve as a solvent for the reaction mixture. In some cases it is advantageous to add an inert solvent or diluent such as water to the reaction mixture to facilitate dissipating the heat in case the reaction is exothermic. The process may be operated continuously or intermittently. The reaction and the separation or isolation of the products may be carried out simultaneously or in separate steps. The reaction can be carried out in a closed system or the reaction can be carried out in the vapor phase by mixing the vapors of the reactants and, if desired, by passing the mixture through a hot reaction tube. In general the reaction is carried out under subatmospheric, atmospheric or superatmospheric pressure within the range of from 0.1 to 1000 atmospheres. The preferred pressure range is 1 to 200 atmospheres since best results are had at pressures within this range.

The temperature at which the reactions are effected may be varied over a wide range depending largely upon the nature of the reactants, the results desired and the other conditions of the reaction. Although it is usually desirable to carry out the reactions at elevated temperatures in order to decrease the time of reaction, the reactions may, however, take place at ordinary temperature or even at lower temperatures. The upper temperature limit is the temperature at which decomposition of the reactants and/or products occurs. Temperatures from 50 to 250° C. are preferred because best results are obtained therewith.

Although the reaction of fluoroethylenes with unsaturated aromatic compounds is the preferred process for preparing the products of the present invention, it is to be understood that said compounds can be prepared by other procedures. For instance, as illustrated in Example I, another general method for the provision of substituted aryl fluorocyclobutanes consists in subjecting an aryl fluorocyclobutane to reactions such as nitration, sulfonation, halogenation or Friedel-Crafts type reactions. It is also to be understood that the aromatic fluorocyclo compounds of this invention, had for instance by reaction of a fluoroethylene with an unsaturated aromatic compound, can be converted readily into a wide variety of other aromatic compounds comprising a fluorine-containing four-carbon atom ring by more or less standard organic chemical reactions. Examples of the aforementioned reactions are:

(1)

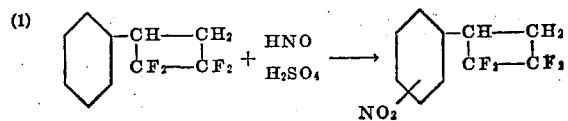

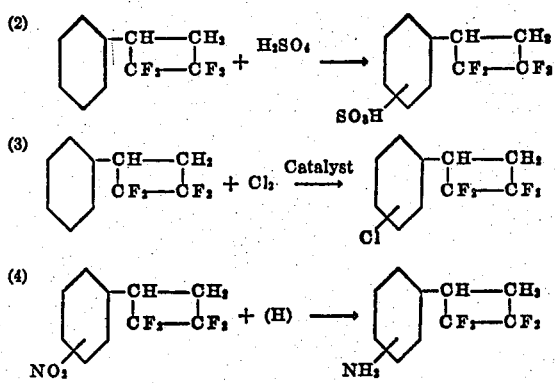

The equipment used in the preparation of the products of this invention can be constructed of glass or of various metals such as iron, steel, aluminum, Monel metal, or copper.

The products of this invention are useful for a wide variety of commercial purposes. Said products are particularly advantageous in that they are stable, aromatic fluorinated four-carbon atom ring compounds which may be subjected to various substitution reactions, such as sulfonation, nitration, and halogenation reactions to prepare a wide variety of compounds which are useful in various applications such as in dyestuffs. Another advantage of the present invention is that it represents the first safe, flexible, practicable and economical method for producing aromatic fluorocyclic compounds of the character herein described. Many of the products are very desirable in that they are substantially non-flammable and non-corrosive.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. A monomeric fluorine-containing organic compound having a four atom ring consisting of carbon atoms, the carbon atom constituting ring position 1 having attached thereto an aromatic group containing not more than three 6-carbon atom rings, the carbon atoms constituting ring positions 2 and 3 having attached thereto four halogen atoms of which at least two are fluorine atoms, and the carbon atom constituting ring position 4 being unsubstituted.

2. A monomeric fluorine-containing organic compound having a four atom ring consisting of carbon atoms, the carbon atom constituting ring position 1 having attached thereto an aryl group containing not more than three 6-carbon atom rings, the carbon atoms constituting ring positions 2 and 3 having attached thereto four fluorine atoms, and the carbon atom constituting ring position 4 being unsubstituted.

3. A monomeric fluorine-containing organic compound having a four atom ring consisting of carbon atoms, the carbon atom constituting ring position 1 having attached thereto a phenylic group, the carbon atoms constituting ring positions 2 and 3 having attached thereto four fluorine atoms, and the carbon atom constituting ring position 4 being unsubstituted.

4. A monomeric fluorine-containing organic compound having a four atom ring consisting of carbon atoms, the carbon atom constituting ring position 1 having a phenyl group attached thereto through a chain of not more than two atoms selected from the group consisting of carbon and oxygen atoms, the carbon atoms constituting ring positions 2 and 3 having attached thereto four fluorine atoms, and the carbon atom constituting ring position 4 being unsubstituted.

5. A compound having the general formula

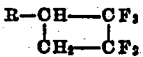

wherein R is an aromatic group containing not more than three 6-carbon atom rings.

6. A compound having the formula

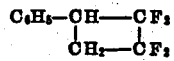

7. A compound having the formula

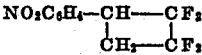

8. A compound having the formula

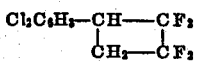

9. The process of preparing an aromatic polyfluorocyclobutane which comprises heating, in the presence of a polymerization inhibitor at a temperature between 50° to 250° C., an unsaturated aromatic compound containing not more than three 6-carbon atom rings and having a terminal methylene group in a side chain of not more than four carbon atoms and one oxygen atom with a tetrahalogenated two carbon atom polyfluoroethylene in which at least two of the halogens are fluorine.

10. The process of preparing an aromatic polyfluorocyclobutane which comprises heating, in the presence of a polymerization inhibitor at a temperature between 50° to 250° C., an unsaturated phenylic compound having a terminal methylene group in a side chain of not more than four carbon atoms and one oxygen atom with tetrafluoroethylene which is stabilized against polymerization on standing under pressure at normal temperature.

11. The process of preparing an aromatic tetrafluorocyclobutane which comprises heating, at a temperature between 50° C. and that at which decomposition of the reactants and product obtained occurs, an unsaturated aromatic compound containing not more than three 6-carbon atom rings and having a terminal methylene group in a side chain of not more than four carbon atoms and one oxygen atom with tetrafluoroethylene which is stabilized against polymerization on standing under pressure at normal temperature.

12. The process of preparing an aromatic tetrafluorocyclobutane which comprises heating, at a temperature between 50° and 250° C., a phenyl compound having a terminal methylene group in a side chain of not more than four carbon atoms and one oxygen atom with tetrafluoroethylene which is stabilized against polymerization on standing under pressure at normal temperature.

13. The process for obtaining 1-phenyl-2,2,3,3-tetrafluorocyclobutane which comprises heating at a temperature within the range of 50° to 250° C., styrene with tetrafluoroethylene which is stabilized against polymerization on standing under pressure at normal temperature.

PAUL L. BARRICK.

(References on following page)

REFERENCES CITED

The following references are of record in the file of this patent:

UNITED STATES PATENTS

| Number | Name | Date |
|---|---|---|
| 1,967,244 | Holt et al. | July 24, 1934 |

OTHER REFERENCES

Egloff, "Reactions of Pure Hydrocarbons," pages 586-9.

Case "Jour. Am. Chem. Soc.," vol. 56, pages 715-17 (1934).

"Chemical Abstracts," vol. 30, cols. 4153-4 (1936) Abstract of article by Swarts.